United States Patent [19]

Sugiyama et al.

[11] Patent Number: 4,896,514
[45] Date of Patent: Jan. 30, 1990

[54] AIR-CONDITIONING APPARATUS

[75] Inventors: Akihiko Sugiyama; Takashi Matsuzaka, both of Fuji, Japan

[73] Assignee: Kabushiki Kaisha Toshiba, Kawasaki, Japan

[21] Appl. No.: 264,875

[22] Filed: Oct. 31, 1988

[30] Foreign Application Priority Data

| Oct. 31, 1987 | [JP] | Japan | 62-167300[U] |
| Dec. 3, 1987 | [JP] | Japan | 62-183745[U] |
| Jan. 28, 1988 | [JP] | Japan | 63-18258 |
| Mar. 30, 1988 | [JP] | Japan | 63-41036 |

[51] Int. Cl.$^4$ ............................................. F24F 3/16
[52] U.S. Cl. ........................................ 62/404; 62/78; 62/93
[58] Field of Search ........................ 62/78 X, 93, 404; 422/4, 120, 122, 123, 255, 306; 436/106; 55/68

[56] References Cited

U.S. PATENT DOCUMENTS

| 2,867,988 | 1/1959 | Brandt | 62/93 |
| 3,758,029 | 9/1973 | Yoshida | 62/78 X |
| 4,576,616 | 3/1986 | Mottram et al. | 55/68 |
| 4,648,888 | 3/1987 | Routland | 55/68 X |
| 4,684,377 | 8/1987 | Haruma et al. | 55/68 X |
| 4,685,939 | 8/1987 | Kratz et al. | 55/68 X |
| 4,756,723 | 7/1988 | Sircar | 55/68 X |

FOREIGN PATENT DOCUMENTS

| 38-25969 | 12/1963 | Japan . |
| 62-1524 | 1/1987 | Japan . |

*Primary Examiner*—William E. Tapolcai
*Attorney, Agent, or Firm*—Cushman, Darby & Cushman

[57] ABSTRACT

An air-conditioning apparatus includes an air-conditioner and an oxygen ratio increasing device. The air-conditioner has an indoor unit having an indoor heat exchanger and arranged in a room to be air-conditioned, and an outdoor unit having an outdoor heat exchanger and arranged outdoors. These units are connected to each other through a coolant pipe. The increasing device has an oxygen ratio increasing mechanism for producing oxygen-ratio increased air having a high oxygen concentration, and an air supply pipe for supplying the produced oxygen-ratio increased air into the room. The mechanism is arranged in the outdoor unit, and includes an adsorbing material for adsorbing nitrogen in air to produce the oxygen-ratio increased air and an air compressor for supplying air to the air supply pipe through the adsorbing material.

17 Claims, 8 Drawing Sheets

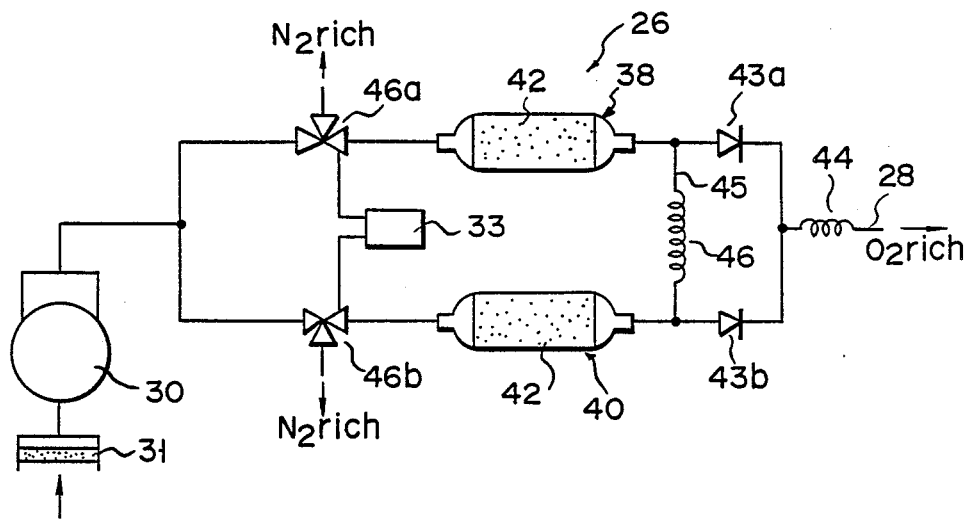
F I G. 5
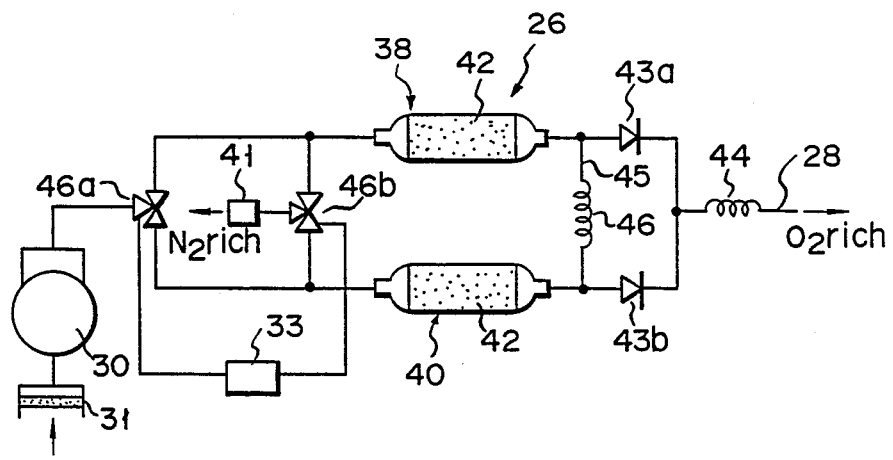
F I G. 6

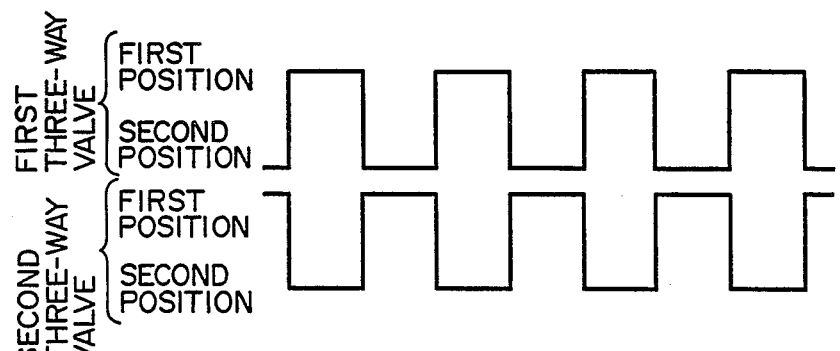
F I G. 12
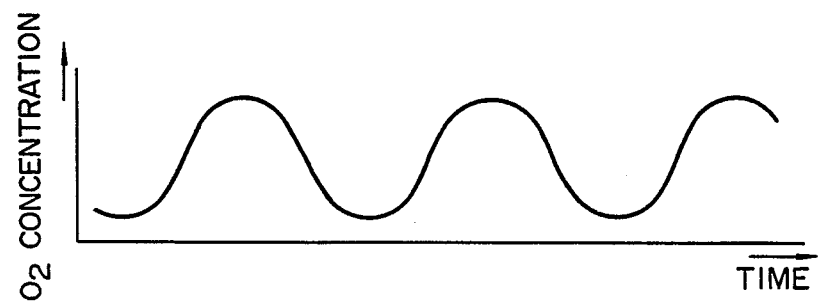
F I G. 13
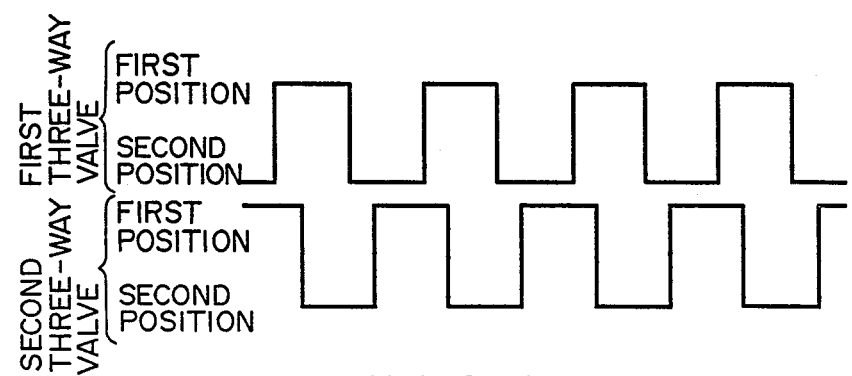
F I G. 14

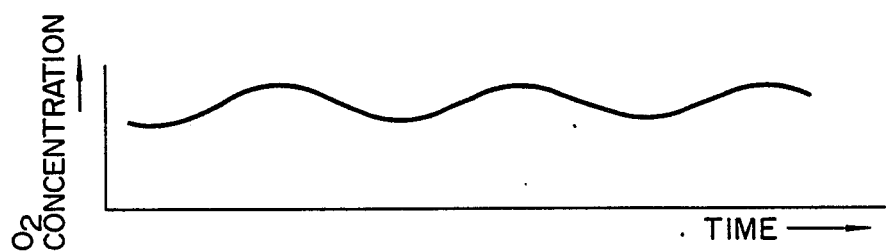
F I G. 15
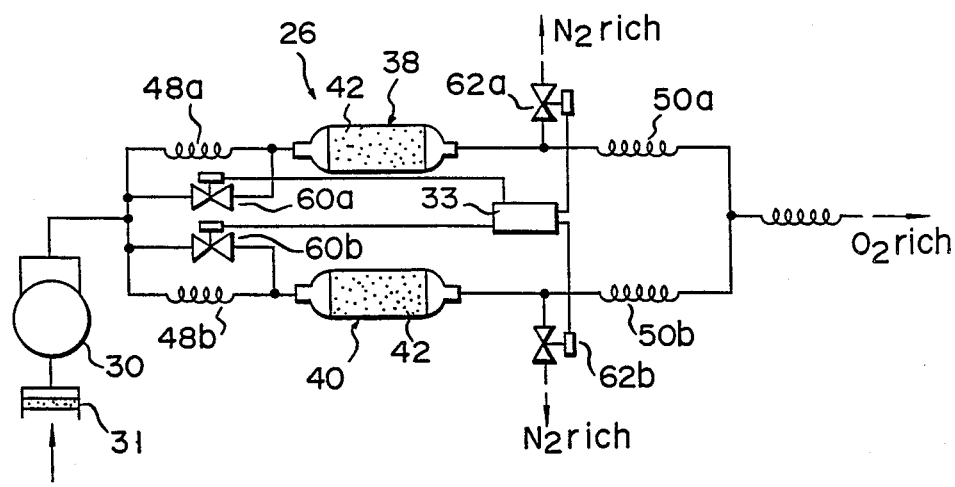
F I G. 16

… … …

AIR-CONDITIONING APPARATUS

BACKGROUND OF THE INVENTION

1. Field of the Invention

The present invention relates to an air-conditioning apparatus and, more particularly, to an air-conditioning apparatus having an oxygen ratio increasing device.

2. Description of the Related Art

In recent years, an air-conditioning apparatus with an oxygen content increasing device has been developed. The oxygen content increasing device is arranged in an indoor unit of the air-conditioning apparatus to produce oxygen from carbon dioxide in indoor air. The produced oxygen is supplied to indoor air to increase an oxygen concentration of the indoor air. The oxygen content increasing device comprises a water tank arranged in the indoor unit and containing water in which a special catalyst is dissolved, a sunbeam receiving unit arranged outdoors, and optical fibers for transmitting sunbeams received by the sunbeam receiving unit to the indoor unit. The sunbeams guided by the optical fibers are emitted on the water tank, and carbon dioxide is blown in the water tank. An organic compound and oxygen are produced by photosynthesis.

However, the content of carbon dioxide in indoor air is generally small. In an oxygen content increasing device for producing oxygen by photosynthesis from this carbon dioxide, oxygen production efficiency is low, and the oxygen concentration of the indoor air cannot be efficiently increased. In nighttime or a cloudy day, when sunbeams cannot be sufficiently received, photosynthesis cannot be performed. As a result, it is impossible to produce oxygen. In addition, since the oxygen content increasing device is arranged in the indoor unit of the air-conditioning apparatus, the indoor unit becomes bulky. A large space for the indoor unit is required, and the installation location is also limited.

SUMMARY OF THE INVENTION

The present invention has been made in consideration of the above situation, and has as its object to provide a compact air-conditioning apparatus capable of stably increasing an oxygen concentration in indoor air with high efficiency.

In order to achieve the above object of the present invention, there is provided an air-conditioning apparatus, comprising: an air-conditioner including an indoor unit having an indoor heat exchanger and arranged indoors, an outdoor unit having an outdoor heat exchanger and arranged outdoors, and a coolant pipe for connecting the outdoor and indoor heat exchangers; and an oxygen ratio increasing device including an oxygen ratio increasing mechanism arranged in the outdoor unit and means for supplying oxygen-ratio increased air produced by the oxygen ratio increasing mechanism to indoors. The oxygen ratio increasing mechanism comprises adsorbing means for adsorbing nitrogen in air and an air compressor for supplying compressed air to the adsorbing means.

BRIEF DESCRIPTION OF THE DRAWINGS

FIGS. 1 to 4 show an air-conditioning apparatus according to a first embodiment of the present invention, in which FIG. 1 is a schematic side view showing an overall construction of the apparatus, FIG. 2 is a circuit diagram of an oxygen ratio increasing mechanism, FIG. 3 is a graph showing nitrogen adsorption properties of zeolite, and FIG. 4 is a graph showing changes in pressures in tanks;

FIG. 5 is a circuit diagram of an oxygen ratio increasing mechanism of an air-conditioning apparatus according to a second embodiment of the present invention;

FIG. 6 is a circuit diagram of an oxygen ratio increasing mechanism of an air-conditioning apparatus according to a third embodiment of the present invention;

FIGS. 11 to 15 show an oxygen ratio increasing mechanism of an air-conditioning apparatus according to a seventh embodiment of the present invention, in which FIG. 11 is a circuit diagram of the mechanism, FIG. 12 is a timing chart of first and second three-way valves, FIG. 13 is a graph showing changes in oxygen concentration of oxygen-ratio increased air produced when the first and second three-way valves are switched at the timings shown in FIG. 12, FIG. 14 is another timing chart of the first and second three-way valves, and FIG. 15 is a graph showing changes in oxygen concentration of oxygen-ratio increased air produced when the first and second three-way valves are switched at the timings shown in FIG. 14; and FIG. 16 is a circuit diagram showing an oxygen ratio increasing mechanism of an air-conditioning apparatus according to an eighth embodiment of the present invention.

DETAILED DESCRIPTION OF THE PREFERRED EMBODIMENTS

Preferred embodiments of the present invention will be described with reference to the accompanying drawings.

Figure 1:
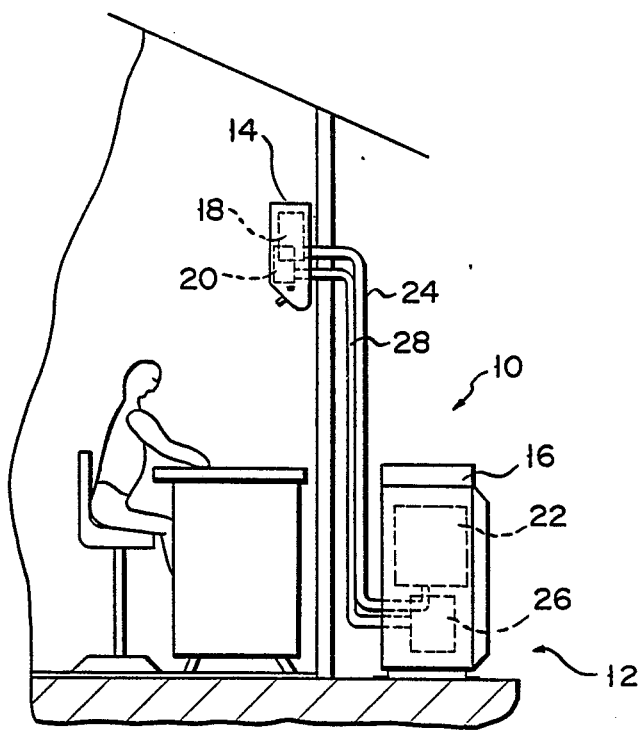

As is shown in FIG. 1, an air-conditioning apparatus comprises air-conditioner 10 and oxygen ratio increasing device 12. Air-conditioner 10 includes indoor unit 14 installed indoors, e.g., on a wall surface of a room subjected to air-conditioning, and outdoor unit 16 arranged outdoors. Indoor heat exchanger 18 and indoor fan 20 are included in indoor unit 14. Outdoor heat exchanger 22, and refrigeration cycle members such as a compressor, a four-way valve, an expansion valve, and an outdoor fan are included in outdoor unit 16. Indoor unit 14 is connected to outdoor unit 16 through coolant pipe 24.

Oxygen ratio increasing device 12 comprises oxygen ratio increasing mechanism 26 arranged in outdoor unit 16, and air supply pipe 28 serving as supplying means for supplying air of a high oxygen concentration produced by the increasing mechanism, i.e., oxygen-ratio increased air to the room. Supply pipe 28 extends along coolant pipe 24 so as to be adjacent thereto. One end of supply pipe 28 is connected to increasing mechanism 26, and the other end thereof is open to indoor unit 14 near indoor fan 20.

Figure 2:
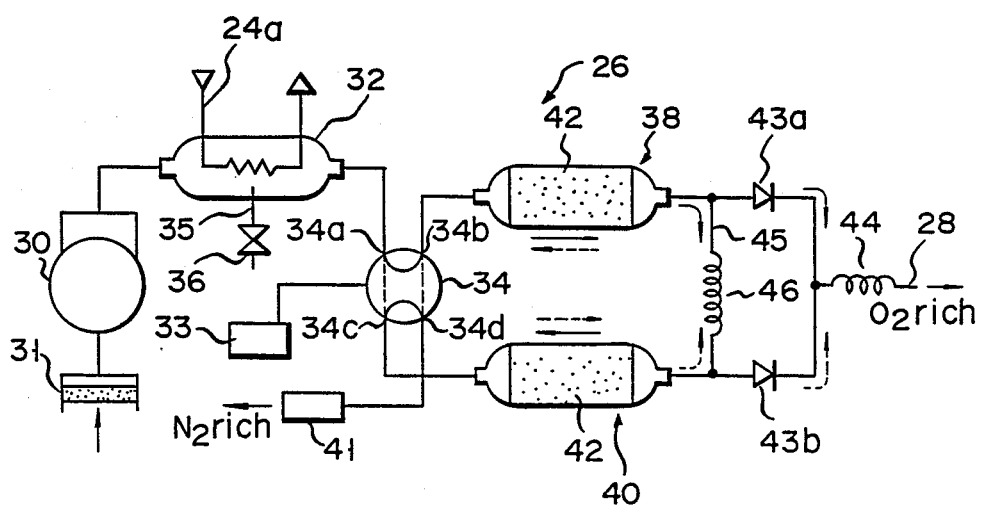

Oxygen ratio increasing mechanism 26 includes air compressor 30, as is shown in FIG. 2. Air filter 31 is connected to the suction side of compressor 30. Surge tank 32 and four-way valve 34 are sequentially connected to the delivery side of compressor 30. Part of coolant pipe 24a continued to a compressor (not shown) of air-conditioner 10 is arranged inside surge tank 32. Drain pipe 35 is connected to the bottom of tank 32. Opening/closing valve 36 is arranged in the drain pipe.

Four-way valve 34 has first to fourth ports 34a to 34d. Surge tank 32 is connected to first port 34a. One end of first tank 38 is connected to second port 34b, one end of second tank 40 is connected to third port 34c, and air exhaust muffler 41 is connected to fourth port 34d. When four-way valve 34 is switched to the first position indicated by solid line in FIG. 2, first port 34a communicates with second port 34b, and third port 34c communicates with fourth port 34d. When valve 34 is switched to the second position indicated by broken lines in FIG. 2, first port 34a communicates with third port 34c, and second port 34b communicates with fourth port 34d. Switching of valve 34 is performed by driving circuit 33.

Figure 3:
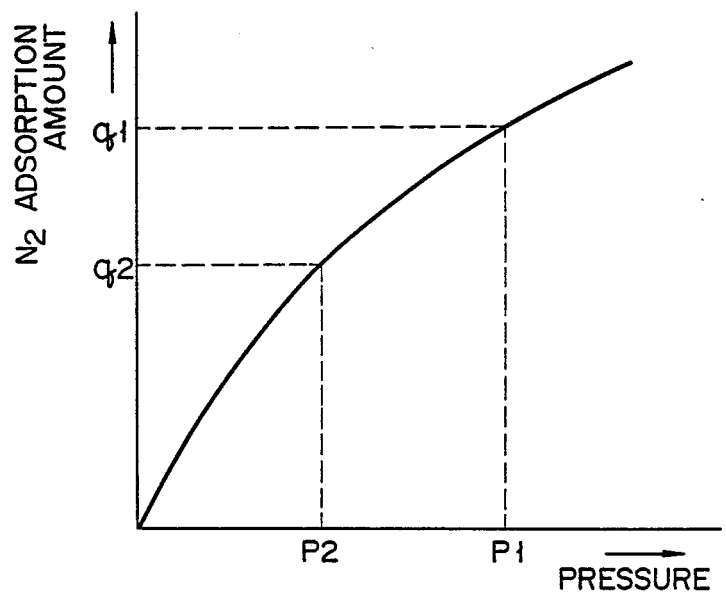

An adsorbing material such as zeolite 42 is filled in first and second tanks 38 and 40. Zeolite 42 adsorbs nitrogen from air. As is shown in FIG. 3, adsorbing ability of zeolite 42 changes in accordance with pressure applied thereto. The other end of each of tanks 38 and 40 is connected to a common pressure reducing means, i.e., restrictor 44 through corresponding reducing check valves 43a and 43b and further communicates with air supply pipe 28 through restrictor 44. One end of bypass pipe 45 is connected between tank 38 and check valve 43a. The other end of bypass pipe 45 is connected between tank 40 and check valve 43b. Restrictor 46 having a larger restriction resistance than that of restrictor 44 is arranged in bypass pipe 45.

An operation of the air-conditioning apparatus having the above mentioned arrangement will be described.

In order to actuate oxygen ratio increasing device 12 together with air-conditioner 10, air compressor 30 is driven. Now, it is assumed that zeolite 42 in first and second tanks 38 and 40 is kept in a state wherein nitrogen is not adsorbed therein, and four-way valve 34 is set in the first position. Upon driving of compressor 30, fresh outer air is introduced in the compressor through air filter 31. Compressed air delivered from compressor 30 is supplied to first tank 38 through surge tank 32 and four-way valve 34 in the order named. As is indicated by solid arrows in FIG. 2, compressed air having passed through first tank 38 is supplied to air supply pipe 28 through check valve 43a and restrictor 44. Part of the compressed air flows in bypass pipe 45. Since restrictors 44 and 46 are arranged on the outlet side of first tank 38, the pressure of air flowing through first tank 38 is almost equal to the pressure of compressed air delivered from compressor 30. For this reason, zeolite 42 in first tank 38 is compressed by the air flow and adsorbs part of the nitrogen $N_2$ in the air flow. An amount of adsorption of zeolite 42 is increased with an increase in pressure, as is shown in FIG. 3. Reference symbol q2 in FIG. 3 represents an amount of nitrogen saturation adsorption. Therefore, the oxygen concentration of the air having passed through first tank 38 is increased, and oxygen-ratio increased air is produced. Most of the oxygen-ratio increased air delivered from tank 38 flows through check valve 43a and restrictor 44 and is then pressure-reduced by restrictor 44. The resultant air is supplied to air supply pipe 28, mixed with indoor air by indoor fan 20, and then supplied to the room. Part of air delivered from first tank 38 flows in second tank 40 through bypass pipe 45 and restrictor 46 and is discharged to the outer atmosphere through four-way valve 34 and air exhaust muffler 41.

When a predetermined period of time has elapsed, the position of four-way valve 34 is changed from the first position to the second position by the driving circuit 33. Compressed air delivered from compressor 30 is supplied to second tank 40 through surge tank 32 and four-way valve 34, as indicated by broken lines in FIG. 2. Zeolite 42 in tank 40 is compressed by the air and adsorbs part of nitrogen in the air, thereby producing oxygen-ratio increased air. Most of the oxygen-ratio increased air is supplied to the room through check valve 43b, restrictor 44, and air supply pipe 28. Part of oxygen-ratio increased air delivered from second tank 40 flows in first tank 38 through bypass pipe 45 and restrictor 46. At this time, zeolite 42 in tank 38 has adsorbed nitrogen in amount q1 by the above-mentioned adsorption operation, as is shown in FIG. 3. When four-way valve 34 is switched from the first position to the second position, first tank 38 communicates with the outer atmosphere through the four-way valve and muffler 41, so that the pressure in tank 38 is reduced to a value substantially equal to the atmospheric pressure. As a result of pressure reduction, zeolite 42 eliminates the nitrogen in an amount corresponding to difference (q1−q2) between amount q1 of adsorbed nitrogen and amount q2 of saturation adsorption. The nitrogen eliminated from zeolite 42 is discharged from first tank 38, as oxygen-ratio increased air flows through first tank 38. Therefore, zeolite 42 in first tank 38 can be regenerated to a state wherein it can adsorb nitrogen, thus preparing for the next adsorption operation. Air of a high nitrogen concentration which has passed through first tank 38 is discharged from the device through four-way valve 34 and muffler 41.

Figure 4:
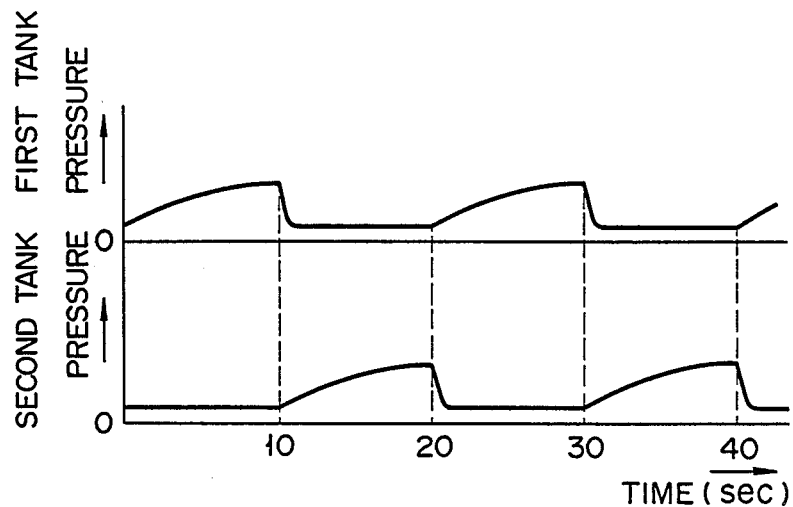

Four-way valve 34 is switched every predetermined cycle by the driving circuit 33, and the above operations are repeated. Therefore, oxygen-ratio increased air is continuously produced by zeolite 42 in first and second tanks 38 and 40 and is supplied to the room through air supply pipe 28. The switching cycle of four-way valve 34 is determined in the accordance with the volumes of tanks 38 and 40. In this embodiment, four-way valve 34 is switched every 10 seconds, as is shown in FIG. 4.

Part of coolant pipe 24a is disposed in surge tank 32 in oxygen ratio increasing mechanism 26. When air-conditioner 10 is operated, the coolant gas of a low temperature state flows through coolant pipe 24a. For this reason, air in surge tank 32 is previously cooled and dehumidified by this coolant gas, and then supplied to first or second tank 38 or 40. By previously cooling and dehumidifying the air to be supplied to zeolite 42, it is possible to remove moisture from the air. (Moisture is more readily adsorbed by zeolite 42 than nitrogen.) Therefore, nitrogen adsorbing ability of zeolite 42 can be greatly improved.

Air supply pipe 28 for supplying the produced oxygen-ratio increased air to the room extends adjacent to cooling pipe 24 of air-conditioner 10. For this reason, oxygen-ratio increased air can be cooled (in the cooling operation mode) or heated (heating operation mode) by the coolant flowing through coolant pipe 24. Therefore, oxygen-ratio increased air can be supplied to the room without preventing air-conditioning in the room.

In the air-conditioning apparatus having the arrangement described above, in addition to the air-conditioning operation of air-conditioner 10, oxygen-ratio increased air produced by oxygen ratio increasing device 12 is supplied to the room to increase the oxygen concentration of indoor air. Oxygen ratio increasing device 12 can stably increase the indoor oxygen concentration with high efficiency regardless of the concentration of carbon dioxide in indoor air, the radiation state of the sun, weather, and the like.

Oxygen ratio increasing mechanism 26 having compressor 30 and four-way valve 34 is arranged in outdoor unit 16. For this reason, noise and vibrations which are produced by driving of increasing mechanism 26 will not be transmitted to the room, thus reducing noise in the room. Since increasing mechanism 26 need not be arranged in indoor unit 14, the indoor unit can be made compact as compared with a conventional indoor unit. Therefore, the installation space of indoor unit 14 can be reduced, and the indoor unit can be installed in an arbitrary position.

In the air-conditioning apparatus described above, the temperature of oxygen-ratio increased air supplied to the room can be increased or decreased in accordance with an operation condition of the air-conditioner. Therefore, indoor air-conditioning of air-conditioner 10 cannot be interfered by oxygen-ratio increased air supplied to the room, thereby performing optimal indoor air-conditioning.

As is shown in FIG. 5, in the first embodiment, oxygen ratio increasing mechanism 26 may comprise a pair of three-way valves 46a and 46b in place of four-way valve 34. Three-way valve 46a is connected between air compressor 30 and first tank 38, and three-way valve 46b is connected between compressor 30 and second tank 40. Three-way valves 46a and 46b are switched by driving circuit 33 at different timings every predetermined cycle.

In a second embodiment having the above arrangement, the same effect as in the first embodiment can be obtained.

FIG. 6 shows still another embodiment using two three-way valves.

In this embodiment, i.e., a third embodiment, first and second tanks 38 and 40 are connected in parallel to each other to the delivery side of air compressor 30 through first three-way valve 46a. Valve 46a can be switched between the first position wherein the delivery side of compressor 30 communicates with first tank 38 and a second position wherein the delivery side of compressor 30 communicates with second tank 40. A path between the first three-way valve and first tank 38 and a path between the first three-way valve and second tank 40 can communicate with the atmospheric air through second three-way valve 46b and air exhaust muffler 41. That is, second three-way valve 46b can be switched between the first position wherein the path between the first three-way valve and first tank 38 communicates with the atmospheric air and a second position wherein the path between the first three-way valve and second tank 40 communicates with the atmospheric air. The diameter of each port of second three-way valve 46b is larger than that of first three-way valve 46a.

When air compressor 30 is driven while first three-way valve 46a and second three-way valve 46b are switched to the first and second positions, respectively, compressed air delivered from the compressor flows in first tank 38 through first three-way valve 46a. For this reason, zeolite 42 in first tank 38 is compressed by the supplied compressed air and adsorbs nitrogen from the air, thereby producing oxygen-ratio increased air. Most of the produced oxygen-ratio increased air is pressure-reduced to the atmospheric pressure through check valve 43a and restrictor 44 and is supplied to air supply pipe 28. Part of the oxygen-ratio increased air delivered from first tank 38 is supplied to second tank 40 through bypass pipe 45 and restrictor 46. At thie time, second tank 40 communicates with the atmospheric air through second there-way valve 46b and muffler 41. For this reason, zeolite 42 in second tank 40 is pressure-reduced to eliminate the adsorbed nitrogen. Therefore, air flowing in second tank 40 is mixed with the nitrogen and has a high nitrogen concentration. This air is discharged outside the device through muffler 41.

When a predetermined period of time has elapsed, first and second three-way valves 46a and 46b are respectively switched to the second and first positions by the driving circuit 33. Thus, oxygen-ratio increased air is produced by the adsorption behavior of zeolite 42 in second tank 40. Zeolite 42 in first tank 38 is regenerated and prepares for the next adsorption operation.

In the third embodiment having the arrangement described above, oxygen-ratio increased air can be stably supplied to the room with high efficiency. The diameter of each port of second three-way valve 46b is set to be larger than that of first three-way valve 46b. Air delivered from air compressor 30 and passing through first three-way valve 46a has a high pressure, so that the density of this air is high and its specific volume is small. However, air supplied from the tank and passing through second three-way valve 46b has a low pressure, so that its density is low, and its specific volume is large. For these reasons, if the diameters of the ports of first and second three-way valves are equal to each other, a time required for supplying a predetermined amount of air to oxygen ratio increasing mechanism 26 and a time taking for delivering the predetermined amount of air from the oxygen ratio increasing mechanism are unbalanced. Therefore, the adsorption time is differentiated from the zeolite regeneration time in the first and second tanks, and operation efficiency of the oxygen ratio increasing mechanism is degraded. However, in this embodiment, the diameter of each port of second three-way valve 46b is set to be larger than that of first three-way valve 46a. Therefore, the adsorption time can be balanced with the regeneration time, and degradation of operation efficiency of increasing mechanism 26 can be prevented.

Figure 7:
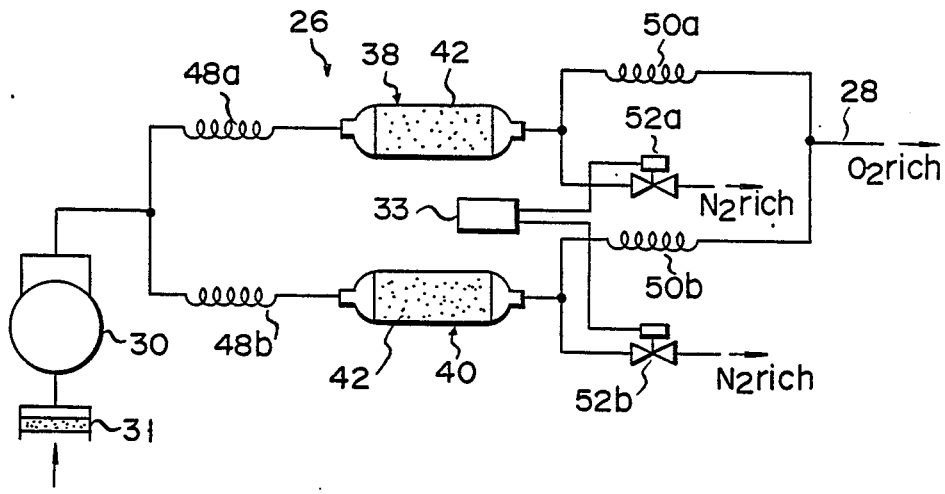
FIG. 7 is a circuit diagram of an oxygen ratio increasing mechanism of an air-conditioning apparatus according to a fourth embodiment of the present invention.

FIG. 7 shows oxygen ratio increasing mechanism 26 of an air-conditioning apparatus according a fourth embodiment of the present invention.

According to the fourth embodiment, first and second tanks 38 and 40 are connected, in parallel to each other, to the delivery side of air compressor 30 through first restrictors 48a and 48b, respectively. Second restrictor 50a and two-way valve 52a are connected, in parallel to each other, to the outlet side of first tank 38. Similarly, second restrictor 50b and two-way valve 52b are connected, in parallel to each other, to the outlet side of second tank 40. Second restrictors 50a and 50b have a larger restriction resistance than that of first restrictors 48a and 48b. The outlet sides of second restrictors 50a and 50b are connected to air supply pipe 28.

Figure 8:
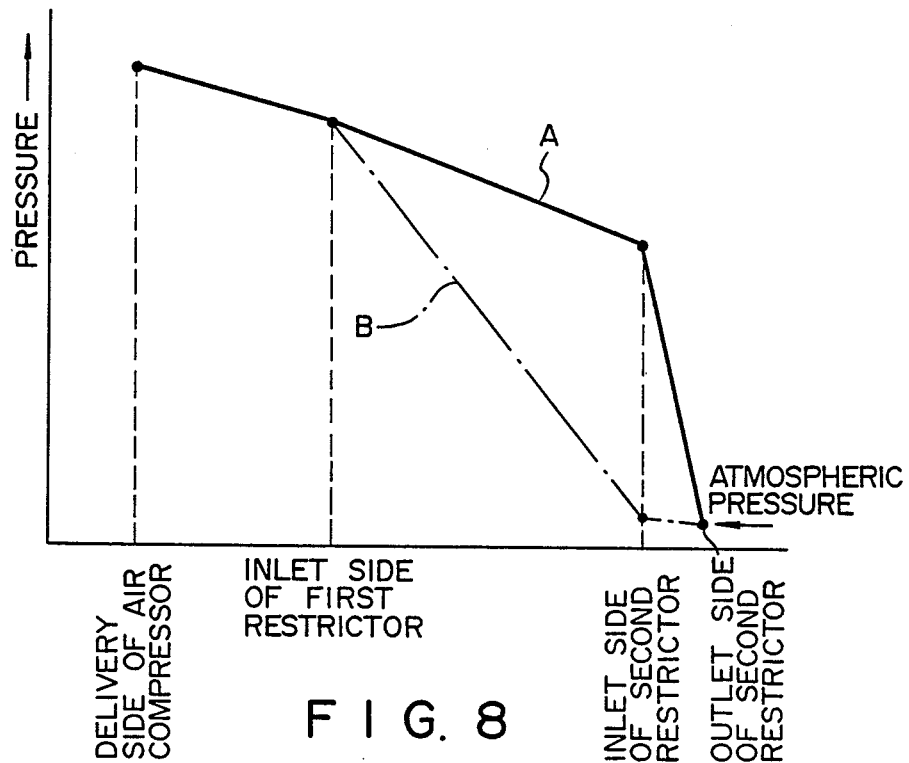
FIG. 8 is a graph showing changes in pressures of tanks in the oxygen ratio increasing mechanism shown in FIG. 7.

In the oxygen ratio increasing mechanism having the above arrangement, when compressor 30 is driven while two-way valve 52a is closed and two-way valve 52b is open, compressed air from the compressor flows in first and second tanks 38 and 40 through first restrictors 48a and 48b. Since two-way valve 52a is kept closed, air having passed through first tank 38 flows in air supply pipe 28 through second restrictor 50a. Since second restrictor 50a has a larger restriction resistance than that of first restrictor 48a, the pressure of air flowing through first tank 38 is almost equal to the pressure of air delivered from compressor 30, as is indicated by solid line A in FIG. 8. Thus, zeolite 42 in first tank 38 is compressed by an air flow and adsorbs nitrogen in the air flow to produce oxygen-ratio increased air. The pressure of the produced oxygen-ratio increased air is reduced to a level of the atmospheric pressure through second restrictor 50a and the air is supplied to the room through air supply pipe 28.

Air having passed through second tank 40 is discharged to the outer atmosphere through two-way valve 52b. Since two-way valve 52b is kept opened, it rarely has a restriction resistance, so that the pressure of air flowing through second tank 40 is reduced to about the atmospheric pressure, as is indicated by one dot and dash line B in FIG. 8. For this reason, zeolite 42 in second tank 40 eliminates the adsorbed nitrogen which is then discharged from the second tank together with air flowing therethrough. As a result, zeolite 42 in second tank 40 is regenerated and prepares for the next adsorption operation.

When a predetermined period of time has elapsed, two-way valve 52a is opened and two-way valve 52b is closed by driving circuit 33. Thus, oxygen-ratio increased air is produced by the adsorption behavior of zeolite 42 in second tank 40 and is supplied to the room through second restrictor 50b and air supply pipe 28. Zeolite 42 in first tank 38 eliminates the adsorbed nitrogen, and the nitrogen is mixed with air flowing through the first tank. This mixture having a high nitrogen concentration is exhausted to the outer atmosphere through two-way valve 52a. Since a large amount of air can flow through first tank 38, the nitrogen eliminated from zeolite 42 can be rapidly discharged from the tank, thereby accelerating regeneration of zeolite. For this reason, two-way valves 52a and 52b need not be simultaneously switched. The adsorption time and the regeneration time can be arbitrarily set to perform a highly efficient operation.

In the fourth embodiment having the arrangement as described above, by switching two-way valves 52 a and 52b by driving circuit 33 every predetermined cycle, oxygen-ratio increased air can be stably supplied to the room with high efficiency as in the first embodiment. In addition, it is possible to use two-way valves which are simple in construction, have a low rate of failure and are low in cost, in place of a four-way valve, so that the manufacturing cost of the oxygen ratio increasing device can be reduced and reliability of the device is improved. Further, in order to regenerate zeolite, part of the oxygen-ratio increased air need not be supplied to the tank, so that the adsorption and regeneration operations of zeolite can be efficiently performed. Therefore, an amount of nitrogen to be adsorbed by zeolite can be increased, and air having a higher oxygen concentration can be produced.

In the fourth embodiment, part of air of a high nitrogen concentration discharged from the tank, during regeneration of zeolite, leaks into air supply pipe 28 through the second restrictor. However, its flow rate is in inverse proportion to the ratio of the restriction resistance of the first restrictor to that of the second restrictor. Since the restriction resistance ratio is extremely large, an amount of leakage of air is extremely small.

Figure 9:
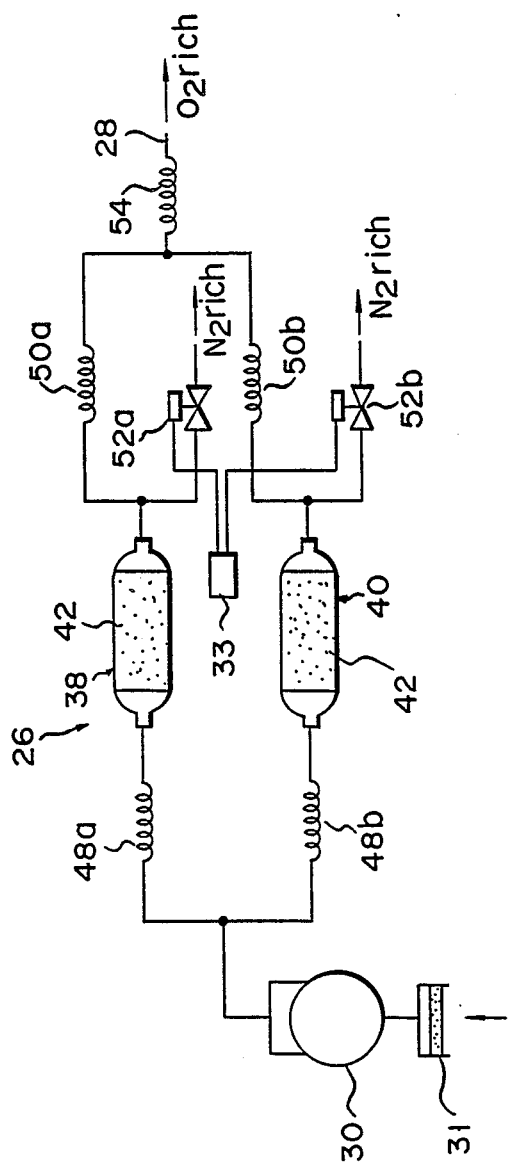
FIG. 9 is a circuit diagram of an oxygen ratio increasing mechanism of an air-conditioning apparatus according to a fifth embodiment of the present invention.

In order to further reduce the amount of leakage of air, third restrictor 54 may arranged between air supply pipe 28 and a merge portion between second restrictors 50a and 50b, as is shown in FIG. 9. In this case, if first tank 38 is located on the adsorption side and second tank 40 is located on the regeneration side, the pressure at the outlet side of second restrictor 50a is increased due to the presence of third restrictor 54. For this reason, air of a high nitrogen concentration, which tends to leak through second restrictor 50b, reflows toward second tank 40 and is exhausted to the outer atmosphere through two-way valve 52b. Therefore, mixing of air having a high nitrogen concentration into the produced oxygen-ratio increased air can be satisfactorily prevented.

Figure 10:
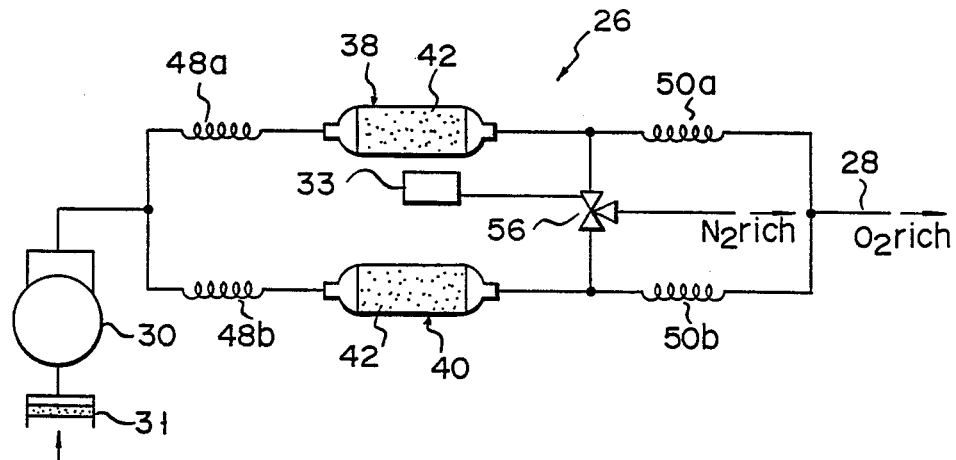
FIG. 10 is a circuit diagram of an oxygen ratio increasing mechanism of an air-conditioning apparatus according to a sixth embodiment of the present invention.

In the fourth embodiment, one three-way valve 56 may be used in place of the two two-way valves, as is shown in FIG. 10. In this case, a three-way valve is more expensive than a two-way valve and its reliability is degraded as compared with the two-way valve. However, only one valve is required, thereby reducing the cost.

Figure 11:
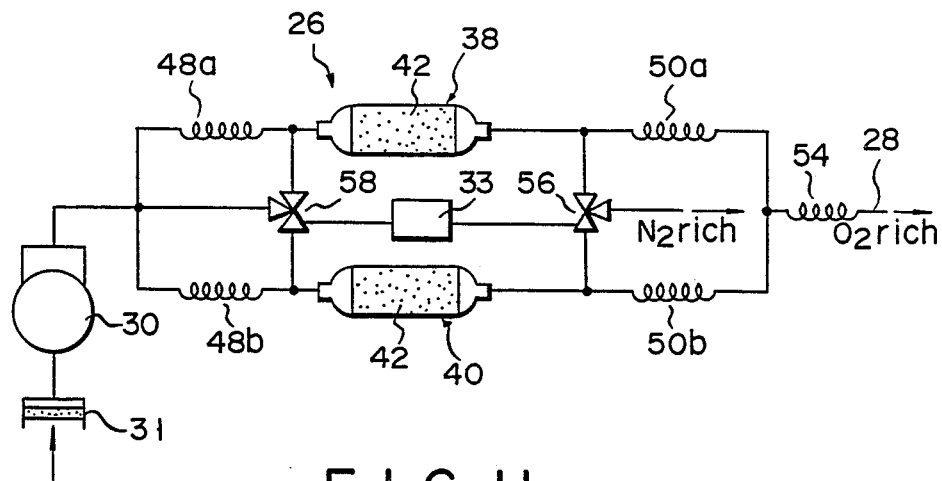

FIG. 11 shows oxygen ratio increasing mechanism 26 of an air-conditioning apparatus according to a seventh embodiment of the present invention.

In the seventh embodiment, second three-way valve 58 is arranged in addition to the arrangement of the sixth embodiment in FIG. 10. Second three-way valve 58 is connected to the delivery side of air compressor 30, between first restrictor 48a and first tank 38, and between first restrictor 48b and second tank 40. Three-way valve 58 can be switched between a first position wherein the delivery side of compressor 30 is connected to first tank 38 and a second position wherein the delivery side of compressor 30 is connected to second tank 40. First three-way valve 56 communicates with a path between first tank 38 and second restrictor 50a, a path between second tank 40 and second restrictor 50b, and the outer atmosphere. Three-way valve 56 can be switched between a first position wherein first tank 38 communicates with the outer atmosphere and a second position wherein second tank 40 communicates with the outer atmosphere. In this embodiment, third restrictor portion between second restrictors 50a and 50b, thereby preventing leakage of air having a high nitrogen concentration into the air supply pipe.

In the seventh embodiment having the above arrangement, when air compressor 30 is driven while first three-way valve 56 is set in the second position and second three-way valve 58 is set in the first position by driving circuit 33, most of compressed air from compressor 30 flows in first tank 38 through second three-way valve 58. At the same time, a very small amount of compressed air flows in first tank 38 through first restrictor 48a. Communication between the outer atmosphere and the outlet side of first tank 38 is inhibited by first three-way valve 56. For this reason, zeolite 42 in first tank 38 is compressed by the air flow and adsorbs nitrogen in the air flow, thereby producing oxygen-ratio increased air. The produced oxygen-ratio increased air flows through the second and third restrictors 50a and 54, where it is reduced in pressure. The resultant air is supplied to the room through air supply pipe 28.

Part of compressed air delivered from compressor 30 flows in second tank 40 through first restrictor 48b. The outlet side of second tank 40 communicates with the outer atmosphere through first three-way valve 56. For this reason, the pressure of the air flowing through second tank 40 is reduced to a level of the atmospheric pressure. As a result, the nitrogen is eliminated from zeolite 42 in second tank 40. This nitrogen is exhausted together with air flowing through the second tank to the outer atmosphere through first three-way valve 56. Since the outlet side of second restrictor 50b is kept at a high pressure by the action of third restrictor 34, air of a high nitrogen concentration which has passed second tank 40 is entirely exhausted to the outer atmosphere without leaking into air supply pipe 28 through second restrictor 50b.

When a predetermined period of time has elapsed, first three-way valve 56 and second three-way valve 58 are switched to the first and second positions, respectively, by driving circuit 33. Therefore, zeolite 42 in second tank 40 produces oxygen-ratio increased air by its adsorption behavior, and zeolite 42 in first tank 38 is regenerated and prepares for the next adsorption operation.

The above operations are repeated to continuously supply oxygen-ratio increased air to the room. When oxygen ratio increasing mechanism 26 is actuated while first and second three-way valves 56 and 58 are simultaneously switched (FIG. 12), an oxygen concentration of the air supplied from air supply pipe 28 to the room is changed as is shown in FIG. 13. As is shown in FIG. 14, the switching timings of first and second three-way valves 56 and 58 may be differentiated from each other. In this case, compression of air in each tank is not abrupt, and an air flow speed can be set to be low. For this reason, an air flow contacts with the zeolite in each tank for a long period of time, thereby producing air having a higher oxygen concentration. Therefore, as compared with the case wherein the first and second three-way valves are simultaneously switched, variations in oxygen concentration of air supplied to the room through air supply pipe 28 can be suppressed, as is shown in FIG. 15.

In the seventh embodiment having the arrangement, oxygen-ratio increased air can be stably supplied to the room with high efficiency. Part of the oxygen-ratio increased air need not be consumed to regenerate zeolite, but the air can be entirely supplied to the room. As a result, the oxygen-ratio increased air can be further effectively supplied to the room.

In the seventh embodiment, a plurality of two-way valves may be used in place of the three-way valves. More specifically, first two-way valves 60a and 60b are arranged in parallel to first restrictors 48a and 48b at the delivery side of air compressor 30. Second two-way valve 62a is arranged in parallel to second restrictor 50a at the outlet side of first tank 38, and second two-way valve 62b is arranged in parallel to second restrictor 50b at the outlet side of second tank 40. First two-way valves 60a and 60b are alternately switched to the open/closed state and second two-way valves 62a and 62b are alternately switched to the open/closed state by driving circuit 33. At the same time, first and second two-way valves 60a and 62a are alternately switched to the open/closed state.

In the eighth embodiment having the above arrangement, the same effect as in the seventh embodiment can be obtained. Use of two-way valves in place of the three-way valves improves reliability of the operation of the oxygen ratio increasing mechanism.

The present invention is not limited to the particular embodiments described above. Various changes and modifications may be made within the spirit and scope of the invention.

For example, the number of tanks which contain zeolite is not limited to two, but can be changed in accordance with application purposes.

What is claimed is:

1. An air-conditioning apparatus comprising:
   an air-conditioner including:
      an indoor unit having an indoor heat exchanger and arranged in a room to be air-conditioned;
      an outdoor unit having an outdoor heat exchanger and arranged outdoors; and
      a coolant pipe for connecting said indoor and outdoor heat exchanger; and
   an oxygen ratio increasing device including:
      an oxygen ratio increasing mechanism, arranged in said outdoor unit, for producing oxygen-ratio increased air having a high oxygen concentration; and
      supplying means for supplying the produced oxygen-ratio increased air to the room, said oxygen ratio increasing mechanism having means for adsorbing nitrogen in air to produce the oxygen-ratio increasing air, an air compressor for supplying air to said supplying means through said adsorbing means, and a surge tank arranged between the adsorbing means and a delivery side of the air compressor, and part of said coolant pipe extending through the surge tank such that heat exchange is performed between air flowing through the surge tank and a coolant flowing through the cooling pipe to dehumidify the air flowing through the surge tank.

2. An apparatus according to claim 1, wherein said adsorbing means includes an adsorbing material for adsorbing nitrogen from air when said adsorbing material is compressed to a pressure more than a predetermined value and for eliminating the adsorbed nitrogen when said adsorbing material is pressure-reduced to a pressure less than the predetermined value, and a plurality of tanks connected, in parallel to each other, between the delivery side of said air compressor and said supplying means, each of said tank containing said adsorbing material therein.

3. An apparatus according to claim 2, wherein said oxygen ratio increasing mechanism includes switching means for causing outlet sides of said tanks to alternately connect to said supplying means, and an outer atmosphere so as to allow the adsorbing material in said tanks to alternately perform an adsorption operation and a regeneration operation.

4. An apparatus according to claim 3, wherein said adsorbing means has first and second tanks.

5. An apparatus according to claim 4, wherein said oxygen ratio increasing mechanism includes a first restrictor arranged between said supplying means and said first and second tanks, check valves respectively arranged between said first tank and said first restrictor and between said second tank and said first restrictor, a bypass which communicates with a path between said first tank and said check valve and a path between said second tank and said check valve, and a second restrictor arranged in said bypass and having a larger restriction resistance than that of said first restrictor.

6. An apparatus according to claim 5, wherein said switching means includes a four-way valve connected between the delivery side of said air compressor and said first and second tanks, and a driving circuit for switching said four-way valve every predetermined cycle, said four-way valve being switched between a first position wherein the delivery side of said air compressor communicates with said first tank and a second position wherein the delivery side of said air compressor communicates with said second tank.

7. An apparatus according to claim 5, wherein said switching means comprises: a first three-way valve arranged between the delivery side of said air compressor and said first tank and to be switched between a first position wherein the delivery side of said air compressor communicates with said first tank and a second position wherein said first tank communicates with the outer atmosphere; a second three-way valve arranged between the delivery side of said air compressor and said second tank and to be switched between a first position wherein the delivery side of said air compressor communicates with said second tank and a second position wherein said second tank communicates with the outer atmosphere; and a driving circuit for switching said first and second three-way valves to different positions every predetermined cycle.

8. An apparatus according to claim 5, wherein said switching means comprises: a first three-way valve arranged between the delivery said of said air compressor and said first and second tanks and to be switched between a first position wherein the delivery side of said air compressor communicates with said first tank and a second position wherein the delivery side of said air compressor communicates with said second tank; a second three-way valve connected between said first three-way valve and said first tank and between said first three-way valve and said second tank and to be switched between a first position wherein said first tank communicates with the outer atmosphere and a second position wherein said second tank communicates with the outer atmosphere; and a driving circuit for switching said first and second three-way valves to different positions every predetermined cycle, said second three-way valve having ports with a larger diameter than that of ports of said first three-way valve.

9. An apparatus according to claim 4, wherein said oxygen ratio increasing mechanism comprises first restrictors arranged between the delivery side of said air compressor and said first tank and between said air compressor and said second tank, respectively, and second restrictors arranged between said supplying means and said first tank and between said supplying means and said second tank, respectively, each of said second restrictors having a larger restriction resistance than that of each of said first restrictors; and said switching means includes a first two-way valve having one end connected between said first tank and said second restrictor and other end which communicates with the outer atmosphere, a second two-way valve having one end connected between said second tank and said second restrictor and the other end which communicates with the outer atmosphere, and a driving circuit for switching said first and second two-way valves to different positions every predetermined cycle.

10. An apparatus according to claim 9, wherein said oxygen ratio increasing mechanism comprises a third restrictor arranged between said second restrictors and said supplying means.

11. An apparatus according to claim 9, wherein said switching means comprises a third two-way valve arranged, in parallel to said first restrictor, between the delivery side of said air compressor and said first tank, and a fourth two-way valve arranged, in parallel to said first restrictor, between the delivery side of said air compressor and said second tank; and said driving means switches said third and fourth two-way valves to different positions every predetermined cycle and said first and third two-way valves to the different positions every predetermined cycle.

12. An apparatus according to claim 4, wherein said oxygen ratio increasing mechanism comprises first restrictors arranged between the delivery side of said air compressor and said first tank and between said air compressor and said second tank, respectively, and second restrictors arranged between said supplying means and said first tank and between said supplying means and said second tank, respectively, each of said second restrictors having a larger restriction resistance than that of each of said first restrictors; and said switching means includes a three-way valve connected between said first tank and said second restrictor and between said second tank and said second restrictor and to be switched between a first position wherein said first tank communicates with the outer atmosphere and a second position wherein said second tank communicates with the outer atmosphere, and a driving circuit for switching said three-way valve every predetermined cycle.

13. An apparatus according to claim 12, wherein said switching means includes a second three-way valve connected between said first tank and said first restrictor, between said second tank and said first restrictor, and to the delivery side of said air compressor, said second three-way valve being switched between a first position wherein the delivery side of said air compressor communicates with said first tank and a second position wherein the delivery side of said air compressor communicates with said second tank, and said driving circuit switches said second three-way valve and said three-way valve to different positions every predetermined cycle.

14. An apparatus according to claim 1, wherein said supplying means comprises an air supply pipe extending from said oxygen ratio increasing mechanism to the inside of the room, said air supply pipe being arranged along said coolant pipe such that heat exchange is performed between the oxygen-ratio increased air flowing through said air supply pipe and a coolant flowing through said coolant pipe.

15. An air-conditioning apparatus comprising:
  an air-conditioner including:
    an indoor unit having an indoor heat exchanger and arranged in a room to be air-conditioned;
    an outdoor unit having an outdoor heat exchanger and arranged outdoors; and
    a coolant pipe for connecting said indoor and outdoor heat exchangers; and
  an oxygen ratio increasing device including:
    an oxygen ratio increasing mechanism, arranged in said outdoor unit, for producing oxygen-ratio increased air having a high oxygen concentration, and supply means having an air supply pipe extending from the oxygen ration increasing mechanism to inside the room, for supplying the produced oxygen-ratio increased air to the room, said oxygen ratio increasing mechanism having means for adsorbing nitrogen in air to produce the oxygen-ratio increased air, and an air compressor for supplying air to the air supply pipe through said adsorbing means, said air supply pipe being arranged along the coolant pipe such that heat exchanger is performed between the oxygen-ratio increased air flowing through the air supply pipe and a coolant flowing through the coolant pipe.

16. An apparatus according to claim 15, wherein said oxygen ratio increasing mechanism comprises a surge tank arranged between said tanks and the delivery side of said air compressor, and part of said coolant pipe of said air-conditioner extends through said surge tank such that heat exchange is performed between air flowing through said surge tank and a coolant flowing through said cooling pipe to dehumidify the air flowing through the surge tank.

17. An air-conditioning apparatus comprising:
an air-conditioner including
an indoor unit having an indoor heat exchanger and arranged in a room to be air-conditioned;
an outdoor unit having an outdoor heat exchanger and arranged outdoors; and
a coolant pipe for connecting said indoor and outdoor heat exchangers;
an oxygen ratio increasing device including:
an oxygen ration increasing mechanism, arranged in said outdoor unit, for producing oxygen-ratio increased air having a high oxygen concentration; and
supplying means for supplying the produced oxygen-ratio increased air to the room; and
wherein said oxygen ratio increasing mechanism includes:
an adsorbing material for adsorbing nitrogen from air when said adsorbing material is compressed to a pressure more than a predetermined value and for eliminating the adsorbed nitrogen when said adsorbing material is pressure-reduced to a pressure less than the predetermined value,
an air compressor for supplying air to said supplying means through said adsorbing material,
first and second tanks connected, in parallel to each other, between the delivery side of the air compressor and the supply means and each containing the adsorbing material therein,
switching means for causing outlet sides of the tanks to alternately connect to the supplying means and an outer atmosphere so as to allow the adsorbing material in the tanks to alternately perform an adsorption operation and a regeneration operation,
a first restrictor arranged between the supplying means and the first and second tanks,
check valves respectively arranged between the first tank and the first restrictor and between the second tank and the first restrictor,
a bypass which communicates with a path between the first tank and the check valve and a path between the second tank and the check valve, and
a second restrictor arranged in the bypass and having a larger restriction resistance than that of the first restrictor.

* * * * *

UNITED STATES PATENT AND TRADEMARK OFFICE
CERTIFICATE OF CORRECTION

PATENT NO. : 4,896,514

DATED : January 30, 1990

INVENTOR(S) : Akihiko Sugiyama, Takashi Matsuzaka

It is certified that error appears in the above-identified patent and that said Letters Patent is hereby corrected as shown below:

On the title page, in item [30]
Please Change:

"Foreign Application Priority Data: (JP) Japan . . . . 63-41036"

to

---Foreign Application Priority Data: (JP) Japan . . . . 63-41036(U)---

Signed and Sealed this

Nineteenth Day of February, 1991

Attest:

HARRY F. MANBECK, JR.

*Attesting Officer*     *Commissioner of Patents and Trademarks*